US011258127B2

(12) United States Patent
Kesper

(10) Patent No.: US 11,258,127 B2
(45) Date of Patent: Feb. 22, 2022

(54) SYSTEM COMPRISING OF A HOLDER AND STORED ENERGY SOURCES WHICH CAN BE PLACED IN THE HOLDER

(71) Applicant: HOPPECKE BATTERIEN GMBH & CO. KG, Brilon (DE)

(72) Inventor: Heinrich Kesper, Willingen (DE)

(73) Assignee: Hoppecke Batterien GmbH & Co. KG, Brilon (DE)

( * ) Notice: Subject to any disclaimer, the term of this patent is extended or adjusted under 35 U.S.C. 154(b) by 0 days.

(21) Appl. No.: 16/607,261

(22) PCT Filed: Apr. 25, 2018

(86) PCT No.: PCT/EP2018/060544
§ 371 (c)(1),
(2) Date: Oct. 22, 2019

(87) PCT Pub. No.: WO2018/197536
PCT Pub. Date: Nov. 1, 2018

(65) Prior Publication Data
US 2020/0303696 A1    Sep. 24, 2020

(30) Foreign Application Priority Data
Apr. 25, 2017    (EP) ..................................... 17167942

(51) Int. Cl.
*H01M 50/20*    (2021.01)
*H01M 10/04*    (2006.01)
(Continued)

(52) U.S. Cl.
CPC ....... *H01M 50/20* (2021.01); *H01M 10/0481* (2013.01); *H01M 50/103* (2021.01);
(Continued)

(58) Field of Classification Search
None
See application file for complete search history.

(56) References Cited

U.S. PATENT DOCUMENTS 4,425,412 A     1/1984  Dittmann et al.
5,304,434 A *   4/1994  Stone ................. H01M 2/1077
                                                    429/99
(Continued)

FOREIGN PATENT DOCUMENTS

DE    202007012635 U1   11/2007
EP       0922308 B1      3/2001

*Primary Examiner* — Basia A Ridley
*Assistant Examiner* — Heng M. Chan
(74) *Attorney, Agent, or Firm* — Harness, Dickey & Pierce, P.L.C.

(57) ABSTRACT

The disclosure relates to a system comprising a holder and stored energy sources which can be placed in the holder, in particular rechargeable batteries, each having a casing which has side walls and in which are placed electrode plates oriented parallel to the side walls and nonwoven materials containing a bound electrolyte, the electrode plates being placed between adjacent nonwoven materials. The holder consists of at least two supports placed one above the other to hold stored energy sources in such a manner that the side walls of the casing which are oriented parallel to the electrode plates are oriented substantially horizontally. At least one pressure element is situated between the supports and rests on the side walls of the casing of the stored energy sources and transmits at least the weight force of the stored energy sources situated at the top of the holder to stored energy sources situated underneath the stored energy sources situated at the top.

7 Claims, 6 Drawing Sheets

(51) Int. Cl.
*H01M 50/103* (2021.01)
*H01M 50/204* (2021.01)
*H01M 50/262* (2021.01)
*H01M 50/271* (2021.01)
*H01M 50/209* (2021.01)

(52) U.S. Cl.
CPC ....... *H01M 50/204* (2021.01); *H01M 50/209* (2021.01); *H01M 50/262* (2021.01); *H01M 50/271* (2021.01)

(56) References Cited

U.S. PATENT DOCUMENTS

| | | | |
|---|---|---|---|
| 6,641,951 B1 | 11/2003 | Vutetakis et al. | |
| 2013/0249475 A1* | 9/2013 | Kang | H01M 10/4207 |
| | | | 320/107 |

* cited by examiner

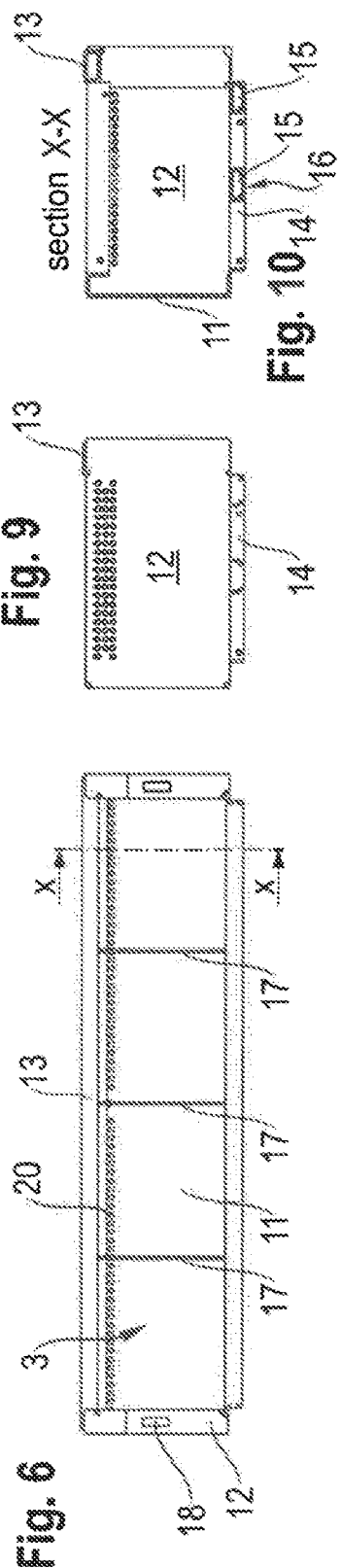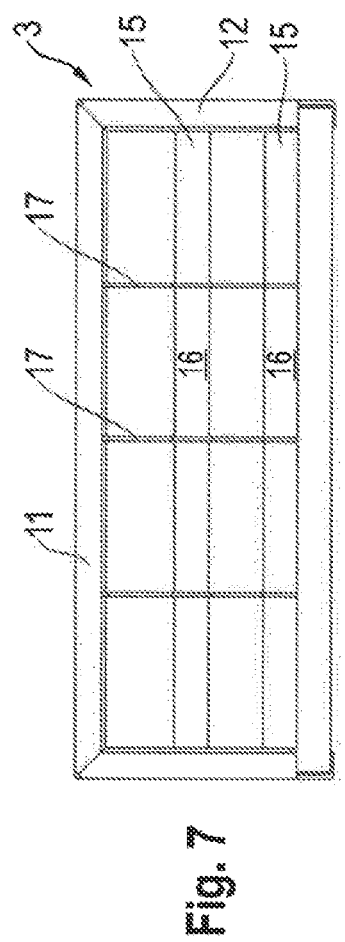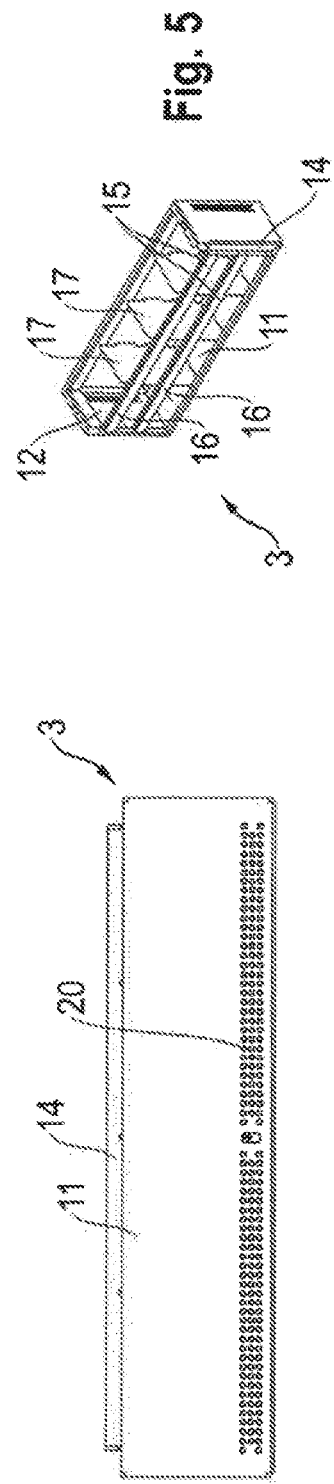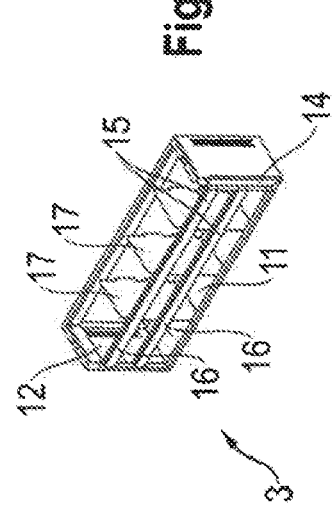

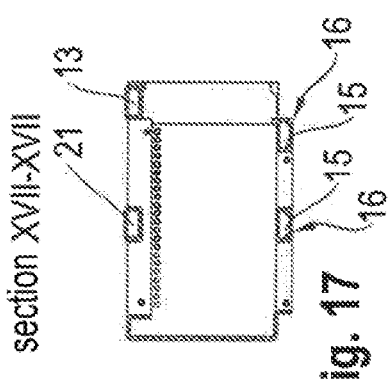
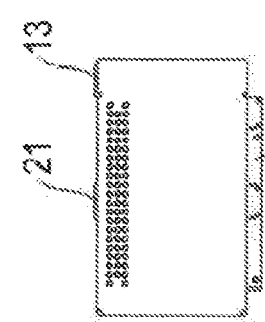
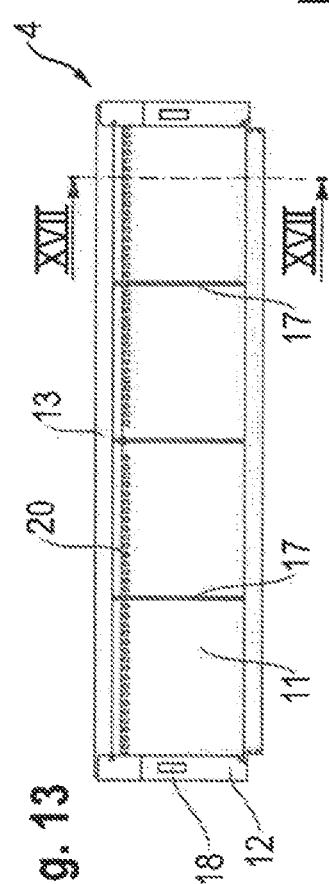
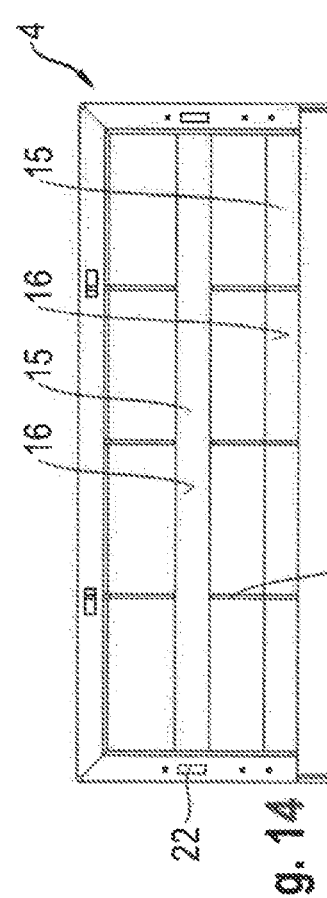
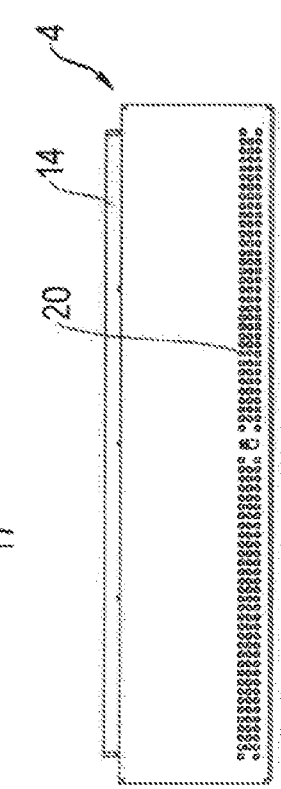
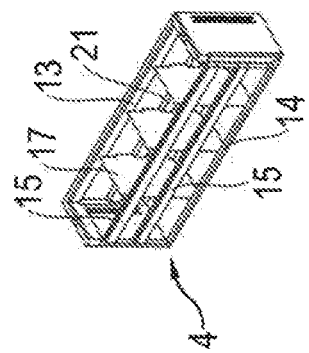
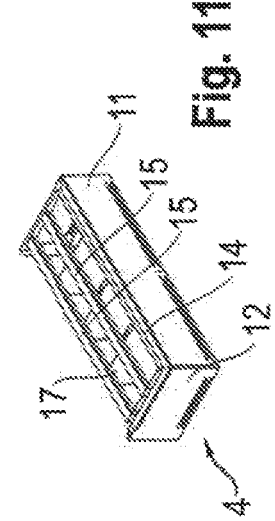

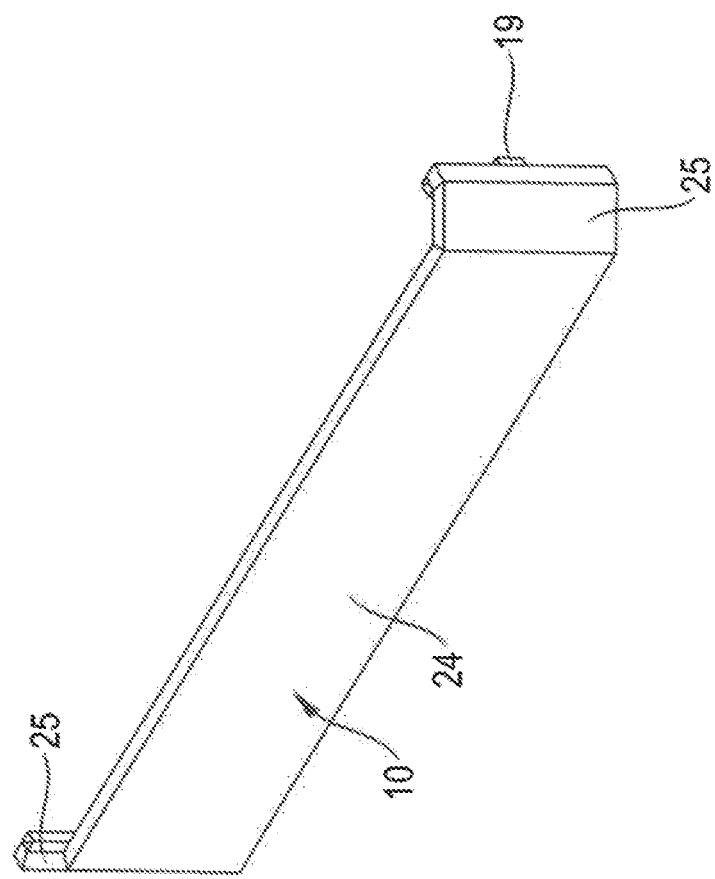

SYSTEM COMPRISING OF A HOLDER AND STORED ENERGY SOURCES WHICH CAN BE PLACED IN THE HOLDER

CROSS-REFERENCE TO RELATED APPLICATIONS

This application is a National Phase of International Application No. PCT/EP2018/060544 filed on Apr. 25, 2018, which claims the benefit of European Patent Application No. 17167942.6, filed on Apr. 25, 2017. The entire disclosures of the above applications are incorporated herein by reference.

FIELD

The disclosure relates to a system comprising of a holder and stored energy sources which can be placed in the holder, in particular rechargeable batteries, each having a casing which has side walls and in which are placed electrode plates oriented parallel to the side walls and nonwoven materials containing a bound electrolyte, the electrode plates being placed between adjacent nonwoven materials. The holder consists of at least two supports placed one above the other to hold stored energy sources in such a manner that the side walls of the casing which are oriented parallel to the electrode plates are oriented substantially horizontally.

BACKGROUND

This section provides background information related to the present disclosure which is not necessarily prior art.

Systems are known from prior art which consist of a shelf-like holder, said holder having several levels which serve to receive stored energy sources, in particular rechargeable batteries. For example, such a holder is known from DE 20 2007 012 635 U1. This pre-known holder has proven itself in prior art and is a component of an energy supply system for supplying pedestrian-controlled lift trucks with electrical energy, these lift trucks including exchangeable batteries which are charged in such an energy supply system.

Rechargeable batteries consisting of a casing with side walls are increasingly being used. In the casing are placed electrode plates running parallel and at least one nonwoven material in which a bound electrolyte is provided. The electrode plates are disposed between adjacent nonwoven materials. Such batteries are also referred to as "AGM" batteries. For a long-lasting usability of such batteries it is necessary that there is always a surface contact between the individual electrode plates and the nonwoven material arranged between them and loaded with electrolyte. To ensure this, plate packs consisting of the electrode plates and the nonwoven materials are inserted into the casing of the battery in a compressed state. However, it has been shown that when used as intended, the casings of the batteries can bulge because they cannot withstand the internal pressure. This bulging results in that the compressed arrangement of electrode plates and the nonwoven materials cannot be maintained, with the negative effect that the contact between the electrode plates and the nonwoven materials decreases, resulting in a significant reduction in the lifetime of such batteries. For example, the pressure inside a casing of these batteries can increase during a charging cycle.

Furthermore, from the U.S. Pat. No. 6,641,951 B1 a casing for battery cells is known which can have a number of compartments depending on the size and number of battery cells to be accommodated. The casing or the compartments must be designed in their geometric dimensions in such a way that the battery cells are held together in a compressed form. Among other things, the casing has lateral side walls, i.e. side walls that are aligned in a vertical direction. These side walls are to be protected against bulging in the horizontal direction. For this purpose, a retaining element connecting the two side walls is provided inside the casing. This retaining element must have an appropriate tensile strength to keep the side walls in a substantially vertical orientation. The retaining element must also be suitable for welding, bonding or mechanically joining to the inside of the side walls.

Furthermore, from the EP 0922308 B1 a battery cell support for sealed lead-acid cells has become known. The battery cell support has a lower part, an upper part and upright side walls and provides a cell holding area. This cell holding area is dimensioned in such a way that a tight-fitting lead cell holding area is permitted. Several of such cell supports can be arranged one above the other in height direction to form a cell support assembly. The lower part of an upper cell support in the height direction is supported by the upper part of the adjacent cell support arranged below this cell support in the height direction. Locking structures are formed on the side walls of the cell supports, which allow a detachable connection of adjacent cell supports.

SUMMARY

This section provides a general summary of the disclosure, and is not a comprehensive disclosure of its full scope or all of its features.

Based on this prior art and in order to avoid the disadvantages described above, it is an object of the disclosure to design a system of this kind in such a way that bulging of the casing of the batteries is prevented as far as possible and that the system is constructed as simple as possible from a few components.

Moreover, such systems are increasingly used to store electricity from renewable energy sources, in particular solar electricity, in order to be able to subsequently draw this electricity, i.e. at a later point in time.

In order to achieve the above object, a system according to the disclosure provides that at least one pressure element is arranged between the supports which rests on the side walls of the casings of the stored energy sources and transfers at least a weight force of the stored energy sources arranged at the top of the holder to stored energy sources which are arranged below the stored energy sources arranged at the top.

The system according to the disclosure thus provides for the stored energy sources to be arranged in such a manner that their weight can be utilized additionally via the pressure element to counteract any possible bulging of the casing in the area of the side walls. Designed in this way, the stored energy sources can maintain better contact between the electrode plates and the nonwoven materials and thus significantly extend the service life. Here it is particularly advantageous that the design of the system is simple with relatively few components and that such a system can be variably configured with regard to its size and adapted to individual requirements.

For this purpose at least two supports arranged one above the other are provided. Each support serves to accommodate several, for example four, stored energy sources. A pressure element is arranged between the supports, which transfers the weight of the stored energy sources arranged in the upper support to the side walls of the stored energy sources arranged below, so that these side walls are additionally loaded.

Therefore, the supports according to the system of the disclosure lie quasi loosely on top of each other in the direction of height. A lower support in the height direction is open to a support arranged above it in the height direction. The pressure element arranged between the two supports can thus rest on the casings, i.e. the side walls of the casings of the stored energy sources, which allows a direct force to be introduced into the stored energy source casings. In contrast to prior art, a weight force exerted by a support does not act on a support arranged below it in the direction of height, but directly on the stored energy source accommodated by this support. A support according to the system of the disclosure does not therefore have a lower base plate and an upper cover plate, which provide for a permanently compressed cell plate arrangement, but instead a pressure element is provided between two adjacent supports, which acts on the stored energy source of the support arranged below in the height direction by utilizing the weight force from an upper support in the height direction, whereby unintentional bulging of the side walls of the stored energy source casings is reliably prevented by a simple design at the same time.

A further feature of the disclosure is that the supports are U-shaped in longitudinal section and each have a web and legs arranged orthogonally to the web, which are connected via a stiffening element, and that the pressure element is in the form of a profile element which is arranged between the legs in the longitudinal direction of the support and has at least one contact surface for resting on the side surfaces of the stored energy sources.

Being configured in this manner, the supports consist only of three side walls and one stiffening element, which makes it possible that the stored energy sources are accessible from one side of the support. This makes it possible, for example, to replace individual stored energy sources in the event of defects without having to dismantle the entire system. If necessary, only the stiffening element bolted to the legs of the support must be removed in order to remove individual stored energy sources from a support.

Furthermore, it is provided that the pressure element is designed as a profile element arranged between the legs in the longitudinal direction of the support. The pressure element thus extends over the entire longitudinal extension of the support and thus rests on the side surfaces of several stored energy sources arranged next to each other in the support. The use of a profile element for this purpose has the advantage that it can be sufficiently stable due to the profiling. In order to achieve sufficient pressure transmission, it has proved to be advantageous to form this profile element with a contact surface that rests on the side surfaces of the stored energy sources. Preferably such a profile element can, for example, be designed as a double T-support or as a box profile with two contact surfaces each, one contact surface resting on the stored energy sources in the lower support and one contact surface being in contact with the side surfaces of the stored energy sources in the upper support.

The process of exchanging stored energy sources or loading a system according to the disclosure with stored energy sources is simplified by the fact that the support is divided into individual receiving compartments for the stored energy sources, in particular plate-shaped separating elements being arranged between the receiving compartments. Individual receiving compartments are formed by the separating elements and are separated from one another. The separating elements, which may preferably be plate-shaped, can also serve to stiffen the support. For this purpose, the separating elements can be guided in guides, for example on the longitudinal wall of the support, and can be fixed there if necessary. Furthermore, the separating elements can also be supported in the area of the stiffening element.

Preferably, the supports arranged on top of each other can be connected to each other in such a manner that a relative movement of adjacently arranged supports is impossible. This can be achieved, for example, by the supports arranged on top of each other having interlocking connecting elements, such as protruding edge regions and corresponding receiving structures. Such a design has the particular advantage that the system can be constructed essentially without additional screws, since the interconnected supports are fixed in their position relative to each other and therefore do not have to be fixed additionally. In addition, the system can have a cover above the uppermost support of the holder which has a pressure element which rests on the side walls of the stored energy sources of the uppermost supports and transfers a weight of the cover at least to the stored energy sources in the uppermost support. By selecting an appropriate sheet thickness, the weight of the cover can be adjusted so that the weight force of this cover is sufficient to reliably prevent bulging of the casings of the stored energy sources located underneath in a support. Of course, even when using a cover with a relatively low sheet thickness, which also means that a metal cover is preferable, its weight can be increased by additional weights. The pressure element formed in the cover can match a pressure element as the same is also arranged between the supports. In addition or alternatively, the top support itself is equipped with a pressure element. In the final assembled state, the stored energy source accommodated by the uppermost support presses from below against the pressure element provided by the uppermost support.

In addition, the inventive system may provide for the supports to be closed with a front cover in the area of the free ends of the legs. Such a front cover does not only have advantages for the aesthetic design of a system, but also covers the stored energy sources to protect them against environmental influences and/or manipulation. For this purpose, for example, the front cover may be connected to the system via a locking system, so that only persons with the appropriate key can remove the front cover. The same applies, of course, also to the fact that the front cover is equipped with fastening elements that require certain tools for opening, which can also only be made accessible to certain persons.

Furthermore, it is provided that the holder has a base which is arranged under the support and which has an abutment with a contact surface for the stored energy sources arranged in the support arranged on the base, the contact surface being provided for bearing against the side surfaces of the stored energy sources. For example, the base may have a larger base area than the supports in order to increase the stability of the system. A connection is also provided between the base and the support arranged on it, which prevents the base from moving relative to the support. In turn, interlocking connecting elements, in particular projecting edge regions and corresponding receiving structures can be provided. The abutment in the base can be designed to match the pressure element between two supports or between a support and the cover.

For solving the above-mentioned problem, a holder according to the disclosure provides for a least one pressure element to be arranged between the supports which can be placed onto the side walls of the stored energy sources and which transmits at least a weight force of the stored energy sources disposed in the upper support to stored energy sources which are disposed in the support below the upper support, the side walls of the casings which are oriented parallel to the electrode plates being essentially aligned horizontally. In this respect, reference is made to the above description of the advantages of a system according to the disclosure.

Finally, for solving the above-mentioned problem, a support according to the disclosure provides for such a support to be composed of a casing U-shaped in longitudinal section which has a web and two legs arranged orthogonally on the web and connected to one another via a stiffening element. Furthermore, a pressure element is provided which is designed as a profile element between the legs in the longitudinal direction of the support, the pressure element being arranged in such a manner that it can be placed onto the side walls of the stored energy sources and transmits at least a weight force to the side walls of the stored energy sources. Of course, such a profile element can also be configured with a corresponding weight to counteract on its part bulging of the casing of the stored energy sources in the region of these side walls. A box profile, for example, can be filled with a material with high bulk density.

Further areas of applicability will become apparent from the description provided herein. The description and specific examples in this summary are intended for purposes of illustration only and are not intended to limit the scope of the pre-sent disclosure.

DRAWINGS

The drawings described herein are for illustrative purposes only of selected embodiments and not all possible implementations, and are not intended to limit the scope of the present disclosure.

Further features of the disclosure will become apparent from the following description of the attached drawings and from the further subclaims. In the drawings it is shown by:

FIG. 4 shows a support of the system according to FIGS. 1 to 3 in a first perspective view;

FIG. 5 shows the support according to FIG. 4 in a second perspective view;

FIG. 6 shows the support according to FIGS. 4 and 5 in a first view;

FIG. 7 shows the support according to FIGS. 4 and 5 in a plan view;

FIG. 8 shows the support according to FIGS. 4 and 5 in a second view;

FIG. 9 shows the support according to FIGS. 4 and 5 in a lateral view;

FIG. 10 shows the support according to FIGS. 4 and 5 in a sectional view along section line X-X in FIG. 6;

FIG. 11 shows an upper support of a holder in a first perspective view;

FIG. 12 shows the support according to FIG. 11 in a second perspective view;

FIG. 13 shows the support according to FIGS. 11 and 12 in a first view;

FIG. 14 shows the support according to FIGS. 11 and 12 in a plan view;

FIG. 15 shows the support according to FIGS. 11 and 12 in a second view;

FIG. 16 shows the support according to FIGS. 11 and 12 in a lateral view;

FIG. 17 shows the support according to FIGS. 11 and 12 in a sectional view along section line XVII-XVII in FIG. 13;

FIG. 18 shows a front cover for a system according to FIGS. 1 to 3 in a perspective view.

Corresponding reference numerals indicate corresponding parts throughout the several views of the drawings.

DETAILED DESCRIPTION

Example embodiments will now be described more fully with reference to the accompanying drawings.

Figure 1:
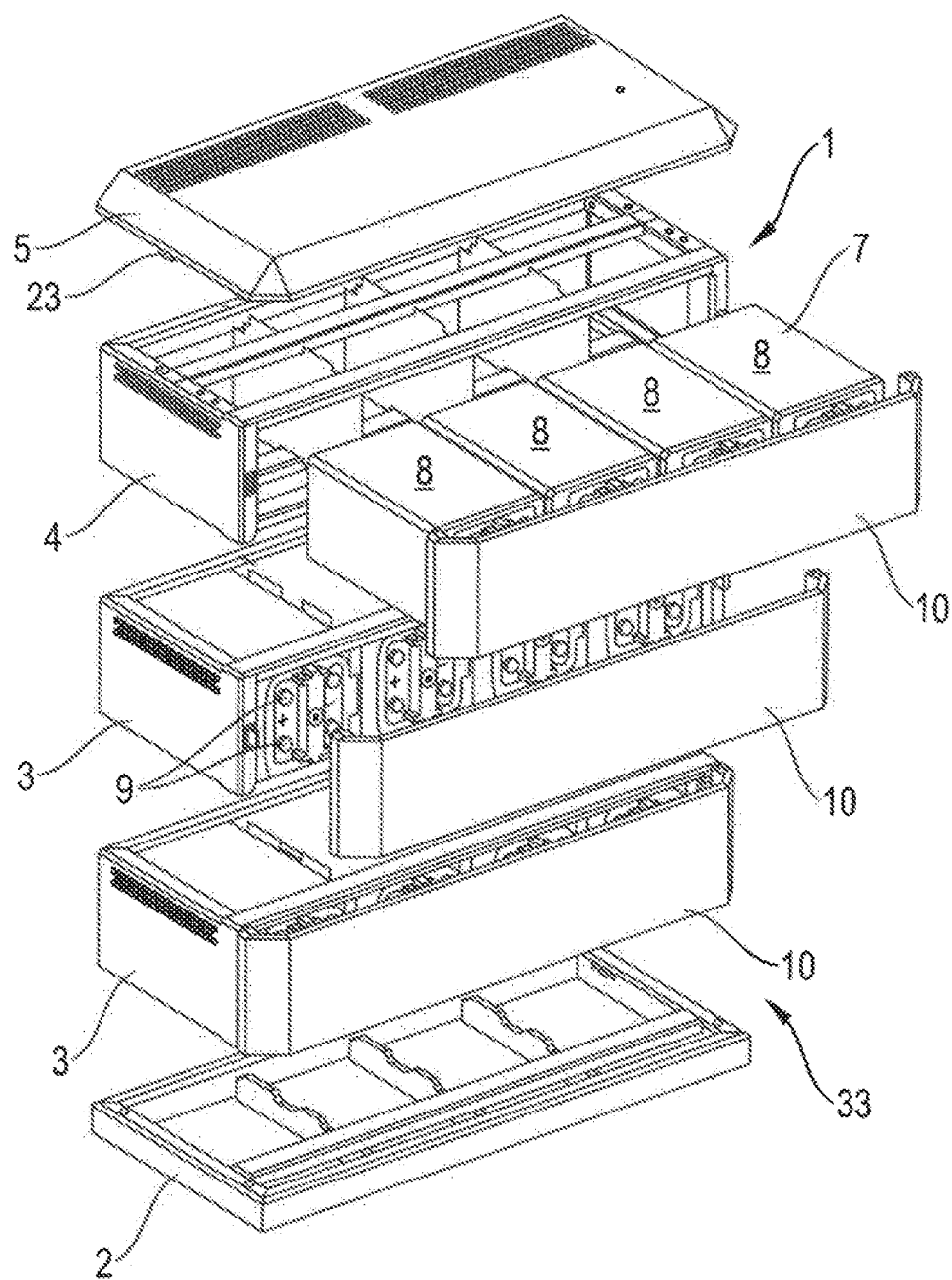
FIG. 1 shows a system in an exploded perspective view.

FIG. 1 shows a system 1 in a perspective exploded view. The system 1 consists of a base 2 and two supports 3 placed one above the other, an upper support 4 arranged above said two supports 3, and a cover 5 arranged on said upper support 4.

In the supports 3, 4, four stored energy sources 6 are arranged horizontally in each case. Each stored energy source 6 consists of a casing 7 with two horizontally aligned side walls 8. Furthermore, connections 9 in the area of the stored energy sources 6 can be seen in FIG. 1.

The exact construction of the individual components of the system 1, namely the base 2, the carriers 3 or 4 and the cover 5 is described below in connection with the further drawing Figures.

FIG. 1 additionally shows front covers 10 which are detachably attached to the supports 3 or 4 in the area of the connections 9 of the stored energy sources 6.

Figure 3:
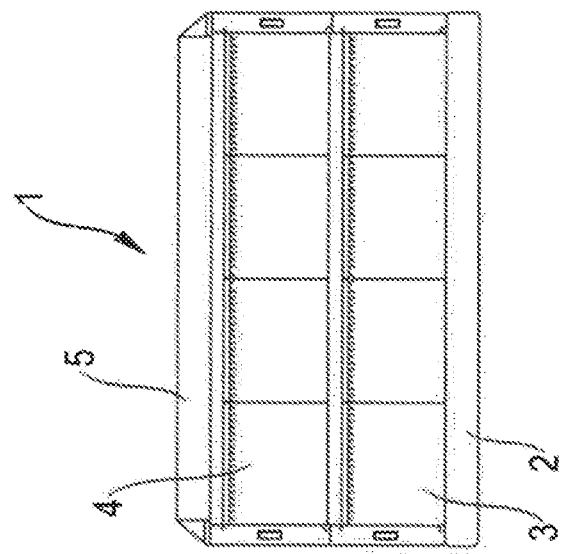
FIG. 3 shows the system of FIG. 2 in a front view without front covers.
Figure 2:
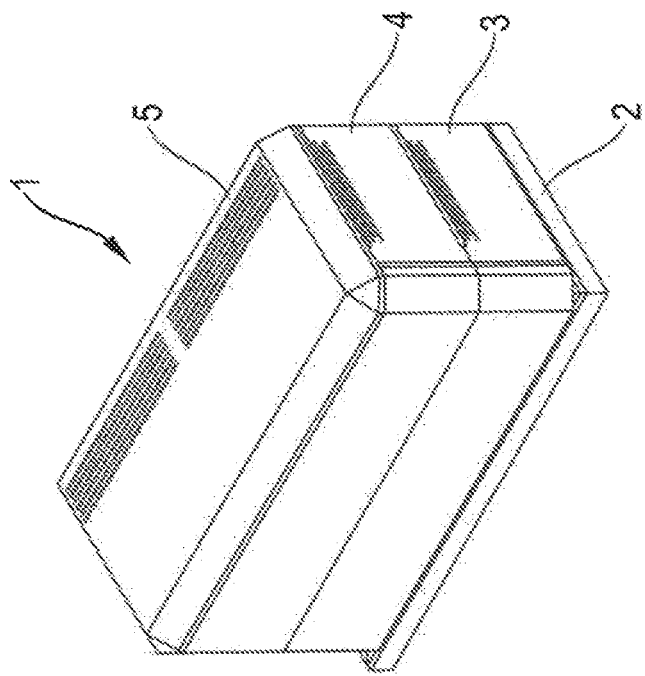
FIG. 2 shows a system in a perspective view.

FIGS. 2 and 3 show a system 1 consisting of the base 2, a support 3 and the upper support 4 as well as the cover 5. This is a system 1 which has the minimum number of supports 3 or of the upper beam 4. Such a system 1 can have up to eleven supports 3, and a different number of compartments can be provided for the stored energy sources 6 not further shown.

The support 3 is shown in detail in FIGS. 4 to 10. Each support 3 is U-shaped in longitudinal section and has a plate-shaped structure or web 11 and two legs 12 arranged orthogonally to the plate-shaped structure or web. In addition, a stiffening element 13 (FIG. 5) is provided, which is designed as a profile and connects the two free ends of the legs 12 to one another, the stiffening element 13 being arranged in the upper corner region of the legs 12.

FIG. 4 shows the bottom view of the support 3, and it can be seen that the web 11 as well as the legs 12 are folded twice at the lower edge region 14 and are thus L-shaped, so that an inwardly projecting edge region 14 is formed. The projection of the edge region 14 is designed in such a way that the surface running parallel to the surface normal of the web 11 or the legs 12 conforms to a corresponding holder at the opposite end of the support 3, so that the edge region 14 can be inserted in a further support 3 in such a manner that the supports 3 arranged one above the other are connected to one another in such a way that a relative movement of the supports 3 arranged adjacent to one another is not possible.

In addition, between the edge regions 14 of the legs 12, two pressure elements 15 extend over the entire length of the support 3 between the facing surfaces of the edge regions 14 of the legs 12. The pressure elements 15 are formed as box profiles and are welded to the edge regions 14 in the region of the legs 12. The pressure elements 15 terminate flush with the free edges of the edge regions 14, the surface of the pressure elements 15 terminating flush with the edge regions of the legs 12 forming a support surface 16 intended to support the legs 12 on the side walls 8 of the stored energy sources 6.

Furthermore, it can be seen from FIGS. 4 and 5 that the support 3 is divided into individual holding areas for the energy storage 6 by the use of plate-shaped separating elements 17. Three separating elements 17 are shown, so that a total of four holding areas are formed for the stored energy sources 6. The separating elements 17 can be connected to the inner surface of the web 11 or guided in guides arranged there. In addition, the separating elements 17 can be connected to the stiffening element 13 and the pressure elements 15.

FIGS. 6 to 10 show further constructive designs of the support 3. FIG. 6, for example, shows in the region of the front faces of the legs 12 a respective rectangular opening 18 which serves to receive connecting elements in the form of locking elements 19 on the front cover 10. Both in the web 11 and in the legs 12 a plurality of bores 20 for ventilation of the support are provided on the surface region facing away from the edge region 14.

It can be seen that the web 11 and also the legs 12 are manufactured from a sheet element, the free ends of the legs 12 being angled by 90° and oriented towards each other. In addition, corner connectors can be provided to reinforce the respective free end of the legs 12, wherein the corner connectors can, for example, be designed as profile elements in the form of box profiles.

FIGS. 11 to 17 show the upper support 4 in various views. The construction of the upper support 4 is substantially identical with the construction of the supports 3 to be arranged beneath the upper support 4. Therefore, corresponding components are identified by corresponding reference numbers.

In addition to the support 3, the upper support 4 has a second stiffening element 21 which is also formed as box profile and extends parallel to the stiffening element 13, the stiffening element 21 also extending between the two legs 12 with a distance to the stiffening element 13 which corresponds to the distance of the second stiffening element 21 to the web 11. The stiffening element 21 additional serves as a pressure element. In the finally mounted state, stored energy sources 6 accommodated by the upper support 4 press from below against the stiffening element 21 serving as pressure element. This prevents undesired bulging of the stored energy sources 6. In this case only an upper support 4 and not a lower support 3 has such a stiffening element 21, and in the final assembled state there is no further support resting on an upper support 4.

Furthermore, a comparison of the FIGS. 14 and 7 shows that the upper support 4 has four openings 22 in the area of the edge region 14 of the legs 12 and of the web 11 which serve to accommodate the locking elements 23 of the cover 5. The locking elements 23 can be seen, for example, in FIG. 1.

In FIG. 18 the front cover 10 is shown in a perspective view. In longitudinal section, the front cover 10 is essentially U-shaped and has a web 24 and two adjoining legs 25 which are angled twice, the locking elements 19 being arranged centrally at the free ends of the legs 25. The front cover 10 has an elasticity that makes it possible to insert the locking elements 19 into the openings 18, the two legs 25 being moved towards each other for this purpose before the locking elements 19 engage in the opening 18. By taking advantage of the elasticity of the front cover 10, the locking elements 19 are then moved to engage behind the openings 18. Of course, alternative locking options are also conceivable, for example the locking elements 19 can be designed as resilient latching lugs.

Figure 19:
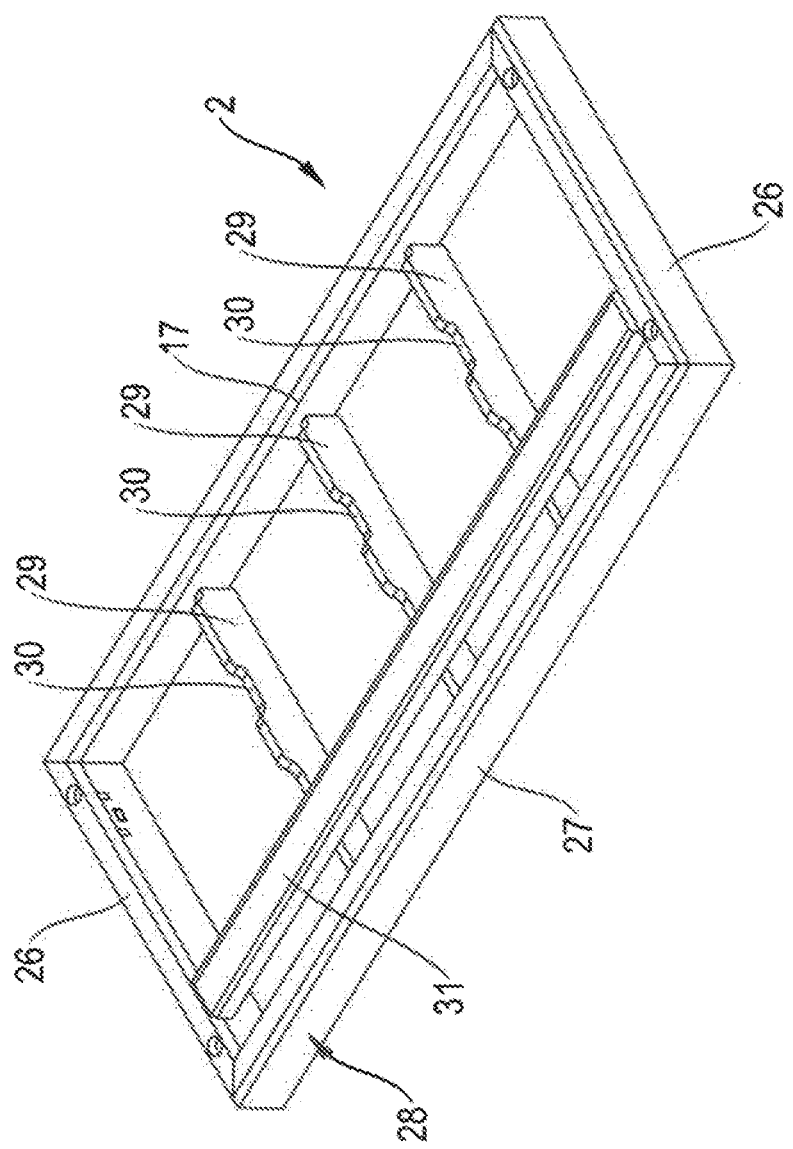
FIG. 19 shows a base for a system according to FIGS. 1 to 3 in a perspective view.

Finally, FIG. 19 shows a perspective view of the base 2. The base 2 consists of two short profile elements 26 and two long profile elements 27, which respectively extend orthogonally to each other and form a frame 28. The two long profile elements 27 are connected by stiffening elements 29 extending with an equal distance to each other and to the short profile elements 26, the stiffening elements 29 having recesses 30 in their upper edge region to accommodate an abutment 31 with a contact surface 32. The abutment 31 is designed as a box profile and terminates substantially flush with the upper surface area of the profile elements 26, 27.

A projection in the range of a maximum of three millimeters can be provided in order to be able to press the contact surface 32 with high precision against the side walls 8 of stored energy sources 6 which are arranged in the support 3, which support 3 is placed on the base 2.

The support 3 and the upper support 4 form a holder 33 for stored energy sources 6 to be arranged in the holder 33. Optionally, this holder 33 is supplemented by the base 2 and by the upper cover 5 and also by the front covers 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A system comprising:
a holder; and
stored energy sources to be placed in the holder, each of the stored energy sources having a casing which has side walls, electrode plates positioned in the casing and oriented parallel to the side walls, and nonwoven materials containing a bound electrolyte, the electrode plates being placed between adjacent nonwoven materials,
wherein the holder comprises at least two separable supports placed one above the other to hold the stored energy sources in such a manner that the side walls of each casing which are oriented parallel to the electrode plates are oriented substantially horizontally and
wherein at least one pressure element is situated between the at least two supports and rests on the side walls of the casings of the stored energy sources and transmits at least a weight force of the stored energy sources situated at the top of the holder to the stored energy sources situated underneath the stored energy sources situated at the top of the holder,
wherein the at least two supports are U-shaped in longitudinal section and each of the at least two supports has a plate-shaped structure and two legs arranged orthogonally to the plate-shaped structure, the legs of each of the at least two supports being connected via a stiffening element,
wherein the at least one pressure element is in the form of a double T-support or a box profile which is arranged between the legs of the at least two supports in the longitudinal direction and has at least one contact surface in direct engagement with the side walls of the casings of the stored energy sources situated underneath the stored energy sources at the top of the holder.

2. The system according to claim 1, wherein the at least two supports are divided into individual receiving compartments for the stored energy sources, wherein separating elements are arranged between the receiving compartments.

3. The system according to claim 1, wherein the at least two supports arranged on top of each other can be connected to each other in such a manner that a relative movement of adjacently arranged supports of the at least two supports is impossible.

4. The system according to claim 3, wherein the at least two supports arranged on top of each other comprise interlocking connecting elements that positively engage into each other.

5. The system according to claim 1, wherein above the uppermost support of the holder, a cover is disposed which has a pressure element which rests on the side walls of the stored energy sources in the uppermost support and transmits a weight force of the cover at least to the stored energy sources in the uppermost support.

6. The system according to claim 1, wherein the at least two supports can be closed with a front cover in an area of free ends of the legs.

7. The system according to claim 1, wherein the holder has a base which is arranged beneath the holder and comprises an abutment having a contact surface for the stored energy sources situated in one of the at least two supports situated on the base, the contact surface being provided for bearing against the side walls of the stored energy sources.

* * * * *